US006971000B1

(12) United States Patent
Sinharoy et al.

(10) Patent No.: US 6,971,000 B1
(45) Date of Patent: Nov. 29, 2005

(54) USE OF SOFTWARE HINT FOR BRANCH PREDICTION IN THE ABSENCE OF HINT BIT IN THE BRANCH INSTRUCTION

(75) Inventors: Balaram Sinharoy, Poughkeepsie, NY (US); Steven Wayne White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,469

(22) Filed: Apr. 13, 2000

(51) Int. Cl.[7] .............................................. G06F 9/44
(52) U.S. Cl. ..................................... 712/239; 712/234
(58) Field of Search ................................ 712/239, 234

(56) References Cited

U.S. PATENT DOCUMENTS

| | | | |
|---|---|---|---|
| 5,125,092 A * | 6/1992 | Prener ......................... | 717/156 |
| 5,454,117 A * | 9/1995 | Puziol et al. .................. | 712/23 |
| 5,642,493 A * | 6/1997 | Burgess ....................... | 711/116 |
| 5,857,098 A * | 1/1999 | Talcott et al. ................ | 712/240 |
| 6,550,004 B1 * | 4/2003 | Henry et al. ................. | 712/239 |

FOREIGN PATENT DOCUMENTS

| | | |
|---|---|---|
| JP | 09-330293 | 12/1997 |
| JP | 10-269172 | 10/1998 |

OTHER PUBLICATIONS

Intel. Pentium® Processor Family Developer's Manual vol. 3: Architecture and Programming Manual. Intel Corporation © 1995. pp. 3-13 to 3-15.*
Hennessy, John L. and Patterson, David A. Computer Architecture A Quantitative Approach. Second Edition. San Francisco, California: Morgan Kaufmann Publishers, Inc. ©1996. pp. 175-177 and 324-326.*
Rosenberg, Jerry M. Dictionary of Comptuers, Information Processing & Telecommunications. Second Edition. New York: John Wiley & Sons, ©1987. p. 268.*
Microsoft Press. Computer Dicitonary: The Comprehensive Standard for Business, School, Library, and Home. Second Edition. Redmond, Washington: Microsoft Press, ©1994. p. 193.*
InstantWeb. On-line Computing Dicionary. ©1997. http://www.instantweb.com/foldoc/foldoc.cgi?computer+dictionary Search Terms: hashing and hash function.*
Intel. Pentium® Processor Family Developer's Manual vol. 3: Architecture and Programming Manual. Mt. Prospect, IL: Intel Corporation, ©1995. pp. 4-25 to 4-26 and D-1 to D-2.*
Patterson, David A. and Hennessy, John L. "Computer Architecture: A Quantitative Approach". Second Edition. San Francisco, CA: Morgan Kaufmann Publishers, Inc. ©1996. pp. 271-277.*
Tanenbaum, Andrew S. "Structured Computer Organization". Second Edition. Englewood Cliffs, NJ: Prentice-Hall, Inc. ©1984. pp. 10-12.*
Rosenberg, Jerry M. "Computers, Information Processing & Telecommunications". Second Edition. New York: John Wiley & Sons, ©1987. Term: Program Counter.*

* cited by examiner

Primary Examiner—Eddie Chan
Assistant Examiner—Aimee Li
(74) Attorney, Agent, or Firm—Winstead Sechrest & Minick P.C.; Mark E. McBurney

(57) ABSTRACT

In a processor, when a conditional branch instruction is encountered, a software prediction for the conditional branch is made as a function of the specific condition register field used to store the branch condition for the conditional branch instruction. If a specified condition register field is not used, the software prediction may be made dependent upon the specific address at which the branch instruction is located.

16 Claims, 6 Drawing Sheets

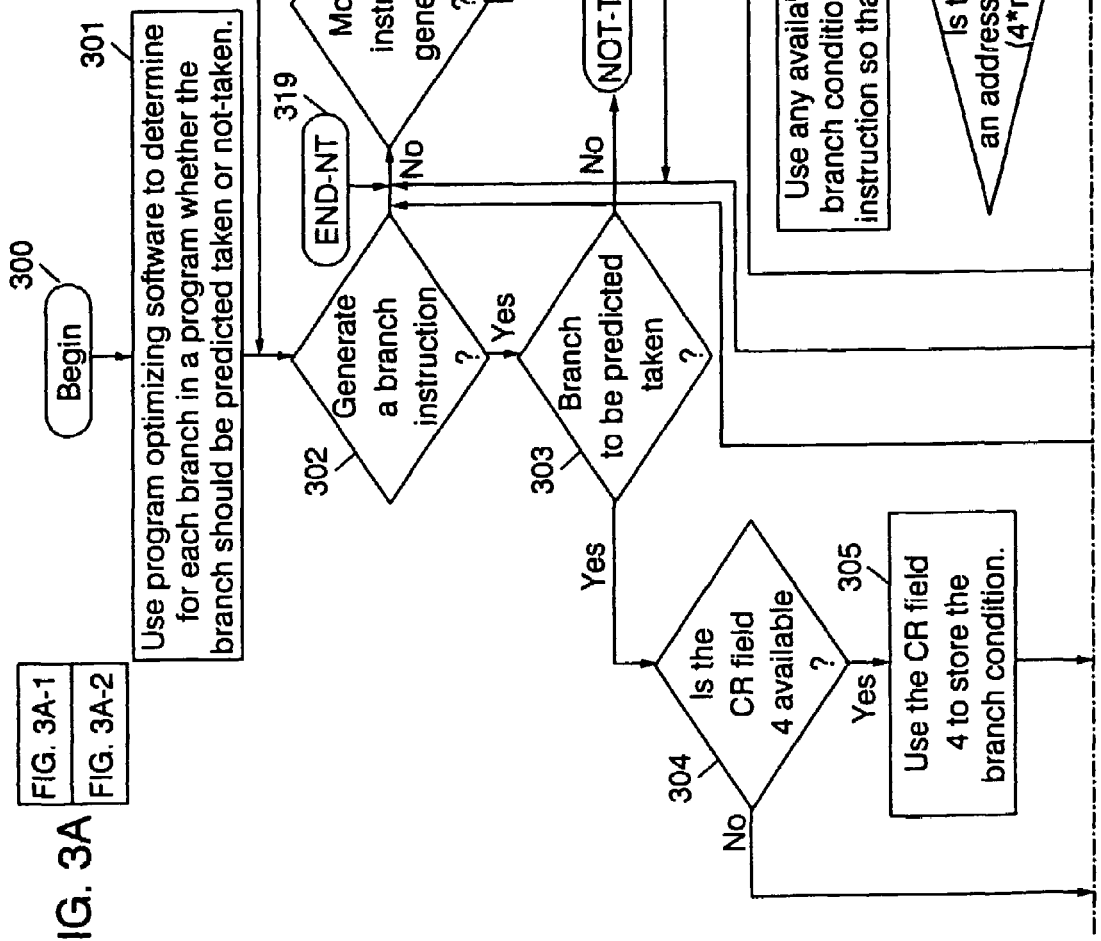

USE OF SOFTWARE HINT FOR BRANCH PREDICTION IN THE ABSENCE OF HINT BIT IN THE BRANCH INSTRUCTION

CROSS-REFERENCE

This application is related to U.S. patent application Ser. No. 09/407,105, entitled "Method and System for Software Control of Hardware Branch Prediction Mechanism in a Data Processor," which is hereby incorporated by reference herein.

TECHNICAL FIELD

The present invention relates in general to data processing systems, and in particular, to a system and method for executing branch instructions within a data processor.

BACKGROUND INFORMATION

A conventional high performance superscalar processor typically includes an instruction cache for storing instructions, an instruction buffer for temporarily storing instructions fetched from the instruction cache for execution, a number of execution units for executing sequential instructions, a Branch Processing Unit (BPU) for executing branch instructions, a dispatch unit for dispatching sequential instructions from the instruction buffer to particular execution units, and a completion buffer for temporarily storing instructions that have finished execution, but have not been completed.

As is well known in the art, sequential instructions fetched from the instruction queue are stored within the instruction buffer pending dispatch to the execution units. In contrast, branch instructions fetched from the instruction cache are typically forwarded directly to the branch processing unit for execution. In some cases, the condition register (CR) value upon which a conditional branch depends can be ascertained prior to executing the branch instruction, that is, the branch can be resolved prior to execution. If a branch is resolved prior to execution, instructions at the target address of the branch instruction are fetched and executed by the processor. In addition, any sequential instructions following the branch that have been pre-fetched are discarded. However, the outcome of a branch instruction often cannot be determined prior to executing the branch instruction. When a branch instruction remains unresolved at execution, the branch processing unit utilizes a prediction mechanism, such as a branch history table, to predict which execution path should be taken. In conventional processors, the dispatch of sequential instructions following a branch predicted as taken is halted and instructions from the speculative target instruction stream are fetched during the next processor cycle. If the branch that was predicted as taken is resolved as mispredicted, a mispredict penalty is incurred by the processor due to the time required to restore the sequential execution stream following the branch instruction. Similarly, for the mispredicted branches that have been predicted not-taken, the instructions that were fetched after the branch instruction are discarded and a mispredict penalty is incurred by the processor due to the time required to restore the target execution stream following the branch.

A high performance processor (CPU) achieves high instruction throughput by fetching and dispatching instructions under the assumption that branches are correctly predicted and allows instructions to execute without waiting for the completion of previous instructions. This is commonly known as speculative execution, i.e., executing instructions that may or may not have to be executed. The CPU guesses which path the branch is going to take. This guess may be a very intelligent guess (as in a branch history table) or very simple guess (as in always guess path not taken). Once the guess is made, the CPU starts executing that path. Typically, the processor executes instructions speculatively when it has resources that would otherwise be idle, so that the operation may be done at minimum or no cost. Therefore, in order to enhance performance, some processors speculatively predict the path taken by an unresolved branch instruction. Utilizing the result of the prediction, the fetcher then fetches instructions from the speculative execution path prior to the resolution of the branch, thereby avoiding a stall in the execution pipeline if the branch is resolved as correctly predicted. Thus, if the guess is correct, there are no holes in the instruction fetching or delays in the pipeline and execution continues at full speed. If, however, subsequent events indicate that the branch was wrongly predicted, the processor has to abandon any result that the speculatively executed instructions produced and begin executing the path that should have been taken. The processor "flushes" or throws away the results of these wrongly executed instructions, backs itself up to get a new address, and executes the correct instructions.

Prior art handling of this speculative execution of instructions includes U.S. Pat. No. 5,454,117 which discloses a branch prediction hardware mechanism. The mechanism performs speculative execution based on the branch history information in a table. Similarly, U.S. Pat. No. 5,611,063 discloses a method for tracking allocation of resources within a processor utilizing a resource counter which has two bits set in two possible states corresponding to whether or not the instruction is speculative or when dispatched to an execution unit respectively. Also, Digital Equipment Corporation's Alpha AXP Architecture includes hint bits utilized during its jump instructions. However, as the name implies, these bits are hint only and are often ignored by the jump mechanism.

Most operations can be performed speculatively as long as the processor appears to follow a simple sequential method, such as those in a scalar processor. For some applications, however, speculative operations can be a severe detriment to the performance of the processor. For example, in the case of executing a load instruction after a branch instruction (known as speculative load because the load instruction is executed speculatively without knowing exactly which path of the branch would be taken), if the predicted execution path is incorrect, there is a high delay penalty incurred when the pending speculative load in the instruction stream requests the required data from the system bus. In many applications, the rate of mispredicted branches is high enough that the cost of speculatively accessing the system bus is prohibitively expensive. Furthermore, essential data stored in a data cache may be displaced by some irrelevant data obtained from the system bus because of a wrongful execution of a speculative load instruction caused by misprediction.

A need, therefore, exists for improvements in branch prediction. Presently, most prediction mechanisms operate as hardware prediction. These predicted paths, when mispredicted, tend to corrupt the hardware memory with the results of the speculatively executed instructions. However, certain classes of branches should not be predicted by hardware when the software can tell with a particular degree of certainty which path to take. Consequently, a system and method for software controlled branch prediction mechanism is desired.

It would therefore be desirable to provide a method and system for combining software and hardware branch prediction in a high performance processor. It is further desirable to provide a method and system which allows a developer or compiler of a software code (or program) which has a pre-determined and/or desired path during branch prediction to control the actual path predicted by manipulating the hardware prediction mechanism with a software input.

For many applications, the compiler can often determine how a conditional branch should be predicted by the hardware at run-time. For some applications, the software branch prediction can be highly accurate. The software branch prediction can be very useful for microprocessors that do not have a hardware branch prediction mechanism. It is also useful for improving the hardware branch prediction accuracy for some application, by combining the software branch prediction with the hardware branch prediction mechanism through mechanisms such as an agree/disagree prediction algorithm which works as follows.

Ordinarily the Branch History Table (BHT) stores the information about the branch's outcome. For example, in a 2-bit per entry BHT implementation, each entry indicates whether the associated BHT entry should be predicted taken (1x) or not-taken (Ox). When a branch is executed, if it is found to be taken, the entry is incremented (if it is already "11", then there is no change). If it is found to be not-taken, the entry is decremented (if it is already "00", then there is no change).

For agree/disagree prediction, instead of storing the taken/not-taken information in the BHT, the information stored is whether the branch outcome at execution was in agreement with the software branch prediction or not. If the software predicted taken and the branch is actually found to be taken when it is executed, then the branch "agrees" with the software prediction. Similarly, if the software prediction is not-taken and the branch is actually found to be not-taken during execution, then also the branch is considered to have "agreed" with the software prediction. Otherwise, the branch "disagrees" with the software prediction. When a branch is executed, its associated entry in the BHT is updated based on whether the branch "agrees" or "disagrees" with the software prediction. If the branch agrees, then the entry is incremented (no change, if it is already "11"). If the branch disagrees, then the entry is decremented (no change, if it is already "00"). When a branch is fetched, if its associated entry in the BHT is "1x", then the branch is predicted to agree with the software prediction, that is predict whatever the software says. On the other hand, when a branch is fetched, if its associated entry in the BHT contains "0x", then the prediction made is opposite of what the software predicted.

The primary advantage of agree/disagree prediction is that, for many applications, it decreases the harmful effects of aliasing in the BHT. That is, if two branches are mapped to the same entry in the BHT, it is highly likely that both will predict "agreed", if the software prediction accuracy is good (even though, one of the branches prediction may be "taken" and the others may be "not-taken").

In many architectures, the branch instructions do not have any unused or reserved bit that can be used to provide branch prediction hint by the software. Such hints can communicate to the hardware how the software thinks the branch should be predicted. For these architectures (which includes PowerPC), this invention describes a way of providing software branch prediction hints to the hardware.

SUMMARY OF THE INVENTION

The present invention addresses the foregoing need. A compiler hint is communicated by the compiler selecting something in the compile code structure which the compiler can control. One alternative is for the compiler to select an "even" line number for a branch operation in the compiled code for a branch that the compiler hints "branch taken." Another is for the compiler to select an even condition register field for the branch to indicate "branch taken."

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
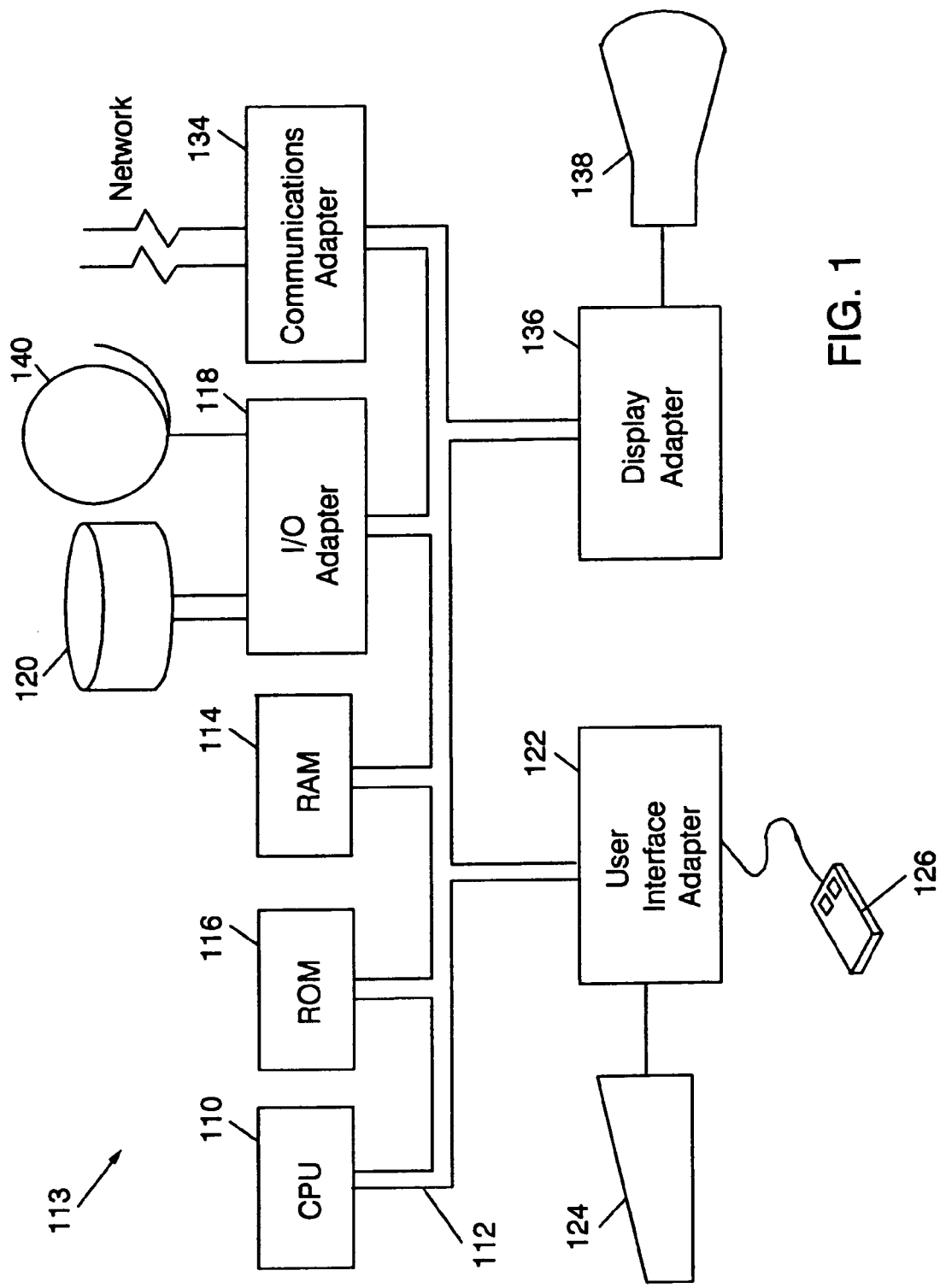
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of workstation 113 in accordance with the subject invention having central processing unit (processor) 110, such as a conventional microprocessor, and a number of other units interconnected via system bus 112. Workstation 113 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting workstation 113 to a data processing network, and display adapter 136 for connecting bus 112 to display device 138.

Figure 2:
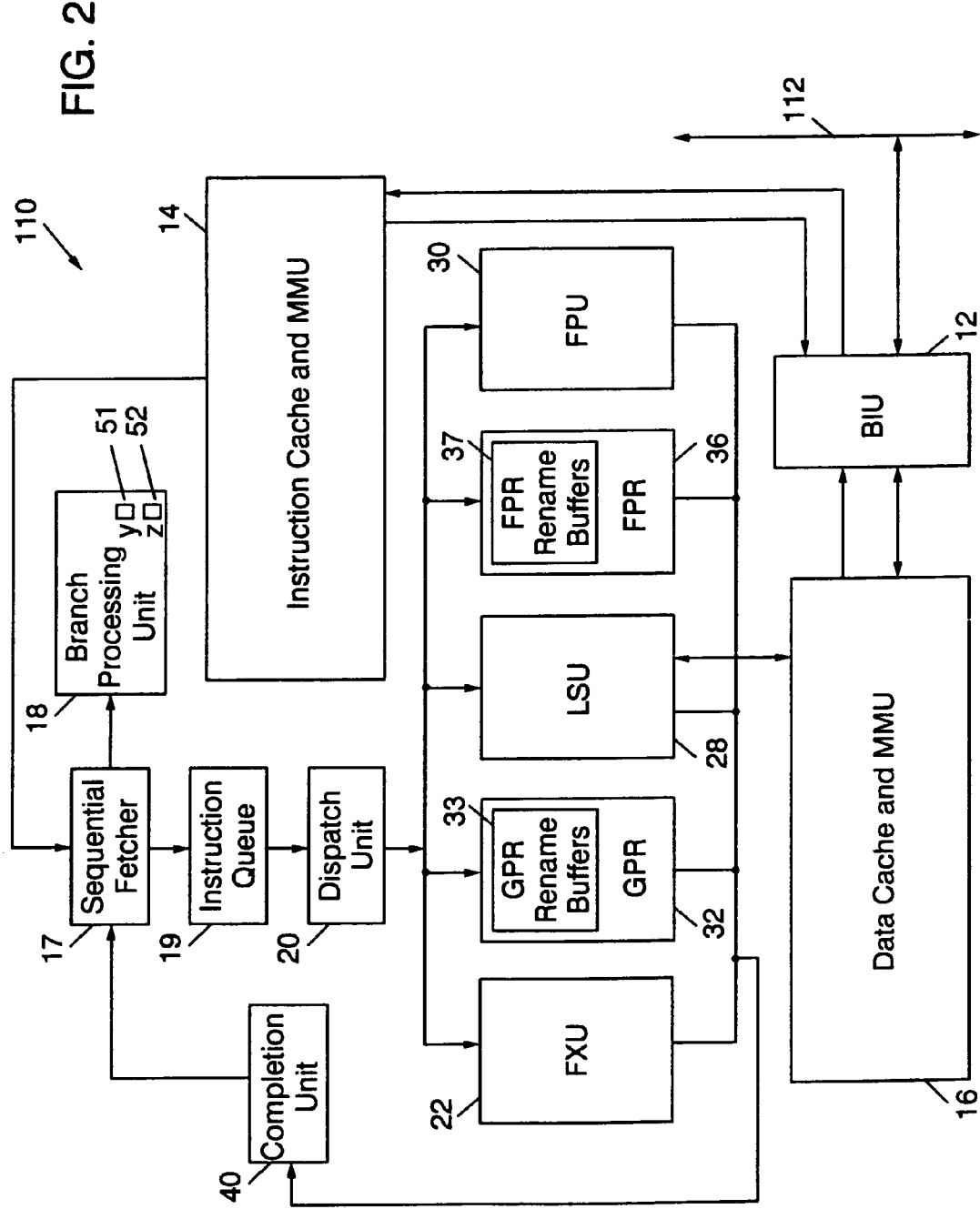
FIG. 2 illustrates a data processor configured in accordance with the present invention.

FIG. 2 is a block diagram of processor 110, for processing information according to an embodiment of the present invention. Processor 110 may be located within data processing system 113 as depicted in FIG. 1. In the depicted embodiment, processor 110 comprises a single integrated circuit superscalar microprocessor. Accordingly, as discussed further below, processor 110 includes various execution units, registers, buffers, memories, and other functional units, which are all formed by integrated circuitry. As depicted in FIG. 1, processor 110 is coupled to system bus 112 via a bus interface unit (BIU) 12 within processor 110. BIU 12 controls the transfer of information between processor 110 and other devices coupled to system bus 112 such as a main memory (not illustrated).

BIU 12 is connected to instruction cache 14 and data cache 16 within processor 110. High speech caches, such as instruction cache 14 and data cache 16, enable processor 110 to achieve relatively fast access time to a subset of data or instructions previously transferred from main memory to instruction cache 14 and data cache 16, thus improving the speed of operation of the data processing system. Instruction cache 14 is further coupled to sequential fetcher 17, which fetches instructions from instruction cache 14 during each cycle for execution. Sequential fetcher 17 stores sequential instructions within instruction queue 19 for execution by other execution circuitry within processor 110. Branch instructions are also transmitted to branch processing unit (BPU) 18 for execution. BPU 18 is a branch prediction and fetch redirection mechanism.

In the depicted embodiment, in addition to BPU 18, the execution circuitry of processor 110 comprises multiple execution units, including fixed-point unit (FXU) 22, load/store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16, a lower level cache, or main memory) into selected GPRs 32 or FPRs 36 or which store data from a selected GPRs 32 or FPRs 36 to memory.

Processor 110 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28 and FPU 30 at a sequence of pipeline stages. As is typical of high performance processors, each instruction is processed at five distinct pipeline stages, namely, fetch, decode/dispatch, execute, finish and completion.

During the fetch stage, sequential fetcher 17 retrieves one or more instructions associated with one or more memory addresses from instruction cache 14. Sequential instructions fetched from instruction cache 14 are stored by sequential fetcher 17 within registers such as instruction queue 19. Additionally, sequential fetcher 17 also forwards branch instructions from within the instruction stream to BPU 18 for execution.

BPU 18 includes a branch prediction mechanism (hardware), which in one embodiment comprises a dynamic prediction mechanism such as a branch history table, that enables BPU 18 to speculatively execute unresolved conditional branch instructions by predicting whether the path will be taken. Alternatively, in other embodiments of the present invention, a static, compiler-based prediction mechanism is implemented. As will be described in greater detail below, the present invention combines software and hardware prediction mechanisms and enables forced prediction of branch instructions.

During the decode/dispatch stage, dispatch unit 20 decodes and dispatches one or more instructions from instruction queue 19 to the appropriate ones of execution units FXU 22, LSU 28 and FPU 30. Decoding involves determining the type of instruction including its characteristics and the execution unit to which it should be dispatched.

During the decode/dispatch stage, dispatch unit 20 allocates a rename buffer within GPR rename buffers 33 or FPR rename buffers 37 for each dispatched instructions' result data. Dispatch unit 20 is connected to execution units FXU 22, LSU 28 and FPU 30 by a set of registers (not shown). Once an instruction is completed processing, a message is sent to completion unit 40 which signals sequential fetcher 17 to fetch another instruction.

For many applications it has been noticed that almost three-fourths of the conditional branches are actually not-taken and only one-fourth of them are taken. This is especially true for applications that have been optimized (for example, optimized through a profile directed feedback mechanism) through an optimizing program restructurer. Based on this information, not-taken branches are favored to taken branches by a ratio of 3 to 1.

The discussed embodiment has eight CR fields in the CR register, though the present invention is not to be limited to such a number. A field in the conditional branch instruction (known as the Branch Information or BI field) indicates which CR field should be used during execution to determine whether the branch is taken or not-taken. Alternatively, the compiler may select an even or odd line number for a branch operation in the compiled code for a branch that the compiler hints has either taken or not taken, as the case may be.

Figures 2, 3A:
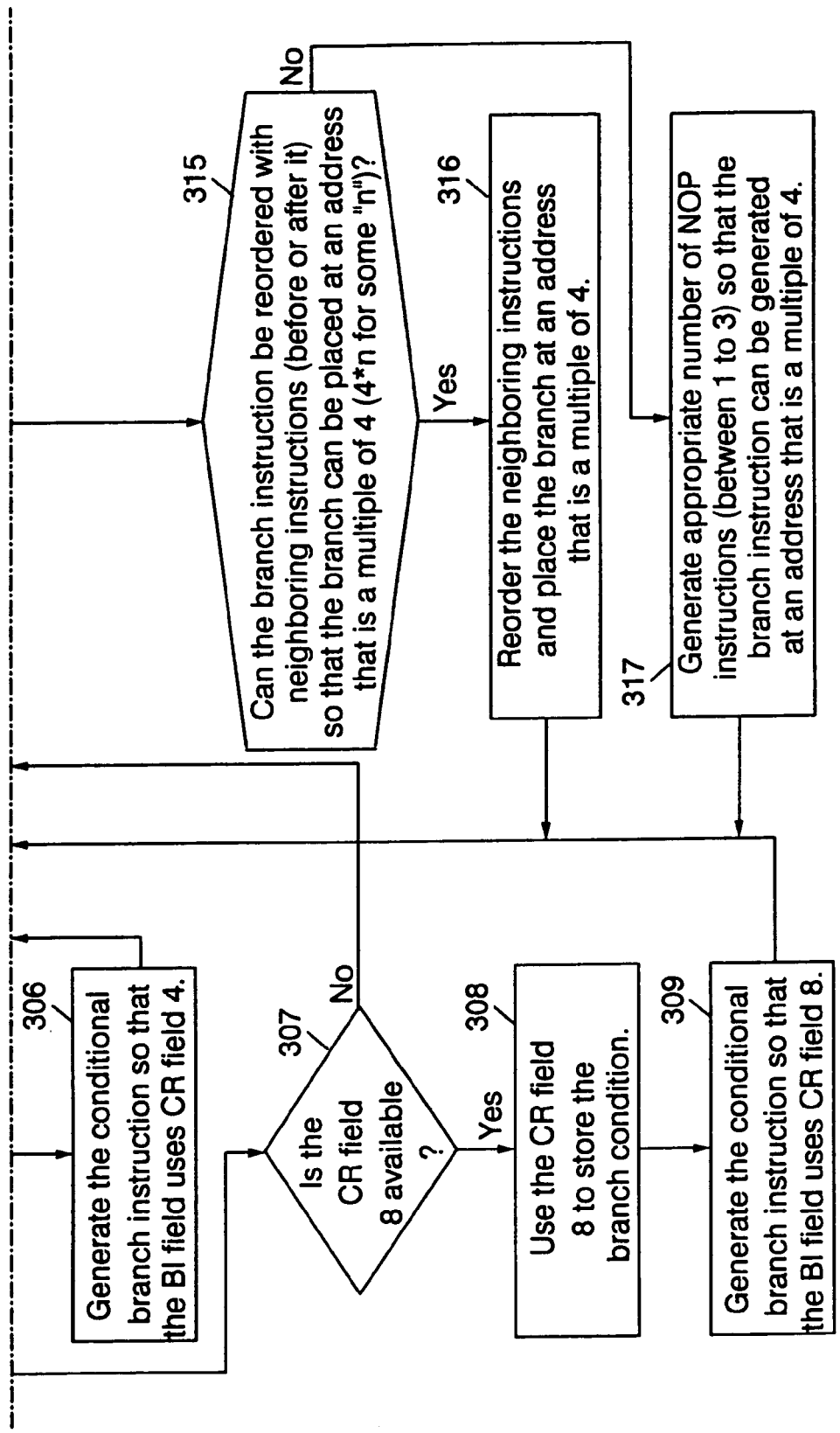
FIGS. 3A and 3B illustrates the compiler generating conditional branch instructions to provide the software hint.
Figure 3B:
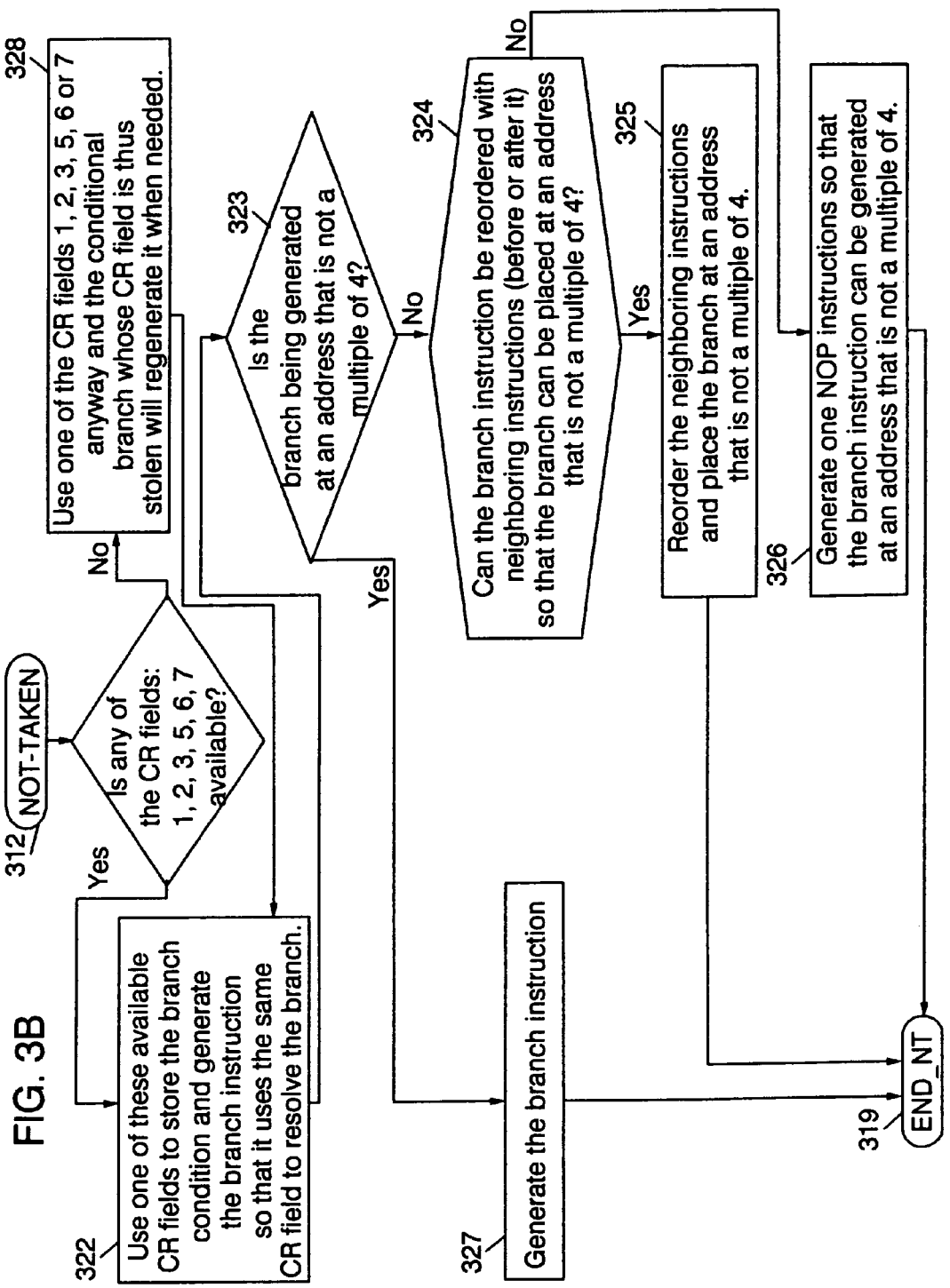

Referring next to FIGS. 3A–3B, there is illustrated a process for the compiler generating conditional branch instructions to provide software hints in accordance with the present invention. This process is performed by the compiler when the conditional branch instruction is generated. The process begins at step 300 and proceeds to step 301 wherein program optimizing software is used to determine for each branch instruction in a program whether the branch instruction should be predicted taken or not-taken. There are two main approaches in this regard: One approach is to use heuristic algorithms, such as a Ball-Larus algorithm, which look through the programming constructs and determine whether a branch should be predicted taken or not-taken. For example, if a programming construct compares to pointers through a linked-list structure to see if there is a match, then it is more likely that they will miscompare, so the branch prediction for the associated branch can be predicted more accurately. Another example is a branch that ends the loop (branch loops back to the top of the loop). This branch should often be taken. There are several other such simple heuristic methods, which have been shown to provide good prediction accuracy. An example may be found within "BRANCH PREDICTION FOR FREE", by Thomas Ball and James R. Larus, Proceedings of the Conference on Programming Language Design and Implementation, 1993, pp. 300–313, which is hereby incorporated by reference herein. Another approach is a profile directed feedback mechanism. Here the program to be optimized is run and the characteristic of each branch is determined first. That is, for each conditional branch it is determined how often the branch is taken and how often the branch is not-taken. If the branch is taken more often then the software predicts taken, otherwise it predicts not-taken. Often the program is run with a training input. The training input is carefully selected so that the program behavior for the real input is similar to the training input.

In step 302, a determination is made whether a branch instruction has been generated. If not, the process proceeds to step 310 to determine if there are more instructions to generate. If not, the process ends at step 320. If there are more instructions to generate at step 310, the process will loop through step 311 to proceed to the next instruction, back to step 302.

In step 303, for each branch instruction, a determination is made whether the branch has been predicted to be taken. If not, the process proceeds to step 312, which is discussed in further detail below with respect to FIG. 3B. If the branch is predicted to be taken in step 303, the process proceeds to step 304 to determine if the condition register (CR) field 4 is available. If not, the process proceeds to step 307. However, if in step 304, the CR field 4 is available, the process proceeds to step 305 to use the CR field 4 to store the branch condition. Most modern architecture has a concept similar to the PowerPC's condition register, although other such architecture may refer to it by a different name. In PowerPC, the CR register (a 32-bit register) has eight fields, each of four bytes, called CR fields. The fields are set by various instructions, but most of the time the fields are set by a compare instruction that compares two GPRs. For example, a PowerPC instruction:

cmp 2, 0, G13, G14 sets the CR field 2. Essentially, the CR field 2 is set to:

100z, if G13<G14
010z, if G13>G14
001z, else where z is called a summary overflow (the fourth bit can be ignored for the purpose of this invention). So, if G13=5 and G14=10, then CR field 2 will have 100z. Since it is CR field 2, the ninth bit in the CR register is set to one because of the execution of the "cmp" instruction. A subsequent conditional branch can use the same CR field as in the instruction:

bc BO, BI, target_address.

BO field informs under what condition the branch should be taken.

BI field tells what CR field to be used to determine these conditions. For example, the instruction below will cause a jump to "target_address":

bc 12, 9, target_address uses the CR register bit 9 (BO field of 12 informs that branch should be taken if the relevant CR bit is one). Similarly, the instruction below will not cause a jump:

bc 4, 9, target_address.

It uses CR register bit 9, but the BO field of 4 informs that the branch should not be taken if the relevant CR bit is one.

Next, in step 306, the process generates the conditional branch instruction so that the BI field uses the CR field 4. The process then proceeds to step 310, as discussed above.

If in step 304, the CR field 4 is not available, the process will proceed to step 307 to determine if the CR field 8 is available. If yes, the process proceeds to step 308 to use the CR field 8 to store the branch condition, then in step 309, the process generates the conditional branch instruction so that the BI field uses the CR field 8. After step 309, the process returns to step 310.

If in step 307 the CR field 8 is not available, the process proceeds to step 313 to use any available CR bit to generate the branch condition and, generate the branch instruction so that it uses the same CR field. The algorithm has two ways to provide the branch prediction hint to the processor:

Position of the CR field used,
If that is not possible (for example, when the desired CR field is not available), then use the address of the branch instruction. Therefore, in this step (the "NO" leg off of step 307), the desired CR fields (field 4 and field 8) are not available, so the algorithm proceeds to use any of the CR field that is available and then proceeds to step 315 where it uses the address of the branch instruction to communicate the branch prediction hint to the processor.

Next, in step 314, a determination is made whether the branch instruction is at an address that is a multiple of four (4*n, for some n). If yes, the process proceeds to step 318 to generate the branch instruction, and then the process returns to step 310. However, if the answer is NO in step 314, the process proceeds to step 315 to determine if the branch instruction can be reordered with neighboring instructions (before or after it) so that the branch can be placed at an address that is a multiple of 4. If not, the process proceeds to step 317 to generate an appropriate number of NOP (No Operation), which is an instruction that has no impact on the machine, that is, it does not change the architected state of the machine instructions (between 1 to 3) so that the branch instruction can be generated at an address that is a multiple of 4. The process then returns to step 310. However, if the answer is YES in step 315, the process proceeds to step 316 to reorder the neighboring instructions and place the branch instruction at an address that is a multiple of 4. If the process is at an address, for example 4*n+1, then the process needs to put three more instructions before it reaches an address that is a multiple of four. If the branch instruction is the next instruction that is being generated and it cannot be reordered with some other instructions that are also being generated at this time (maybe because there is data dependency), then the process places three NOP instructions and reaches the address that is a multiple of four and places the branch instruction. The process then returns to step 310.

As noted above, if the answer is NO in step 303, the process proceeds to step 321 to determine if any of the CR fields 1, 2, 3, 5, 6, or 7 are available. If not, then the process proceeds to step 328 to use one of the CR fields 1, 2, 3, 5, 6, or 7 anyway and the conditional branch instruction whose CR field is thus stolen will be regenerated when needed. Thereafter, both steps 321 under a YES condition and step 328 proceed to step 322 where one of the available CR fields is then used to store the branch instruction and generate the branch instruction so that it uses the same CR field to resolve the branch. The process then proceeds to step 323 to determine if the branch being generated is at an address that is not a multiple of 4. If YES, the process proceeds to step 327 to generate the branch instruction, and the process returns to step 319 and then step 310.

If in step 323 the answer is NO, the process proceeds to step 324 to determine if the branch instruction can be reordered with neighboring instructions (before or after it) so that the branch instruction can be placed at an address that is not a multiple of 4. If not, the process proceeds to step 326 to generate one NOP instruction so that the branch instruction can be generated at an address that is not a multiple of 4. Step 326 is similar to step 317. If in step 324, the answer is YES, the process proceeds to step 325 to reorder the neighboring instructions and place the branch instruction at an address that is not a multiple of 4. Step 325 is similar to step 316. Both steps 325 and 326 return to step 319, which then returns to step 310.

Figure 4:
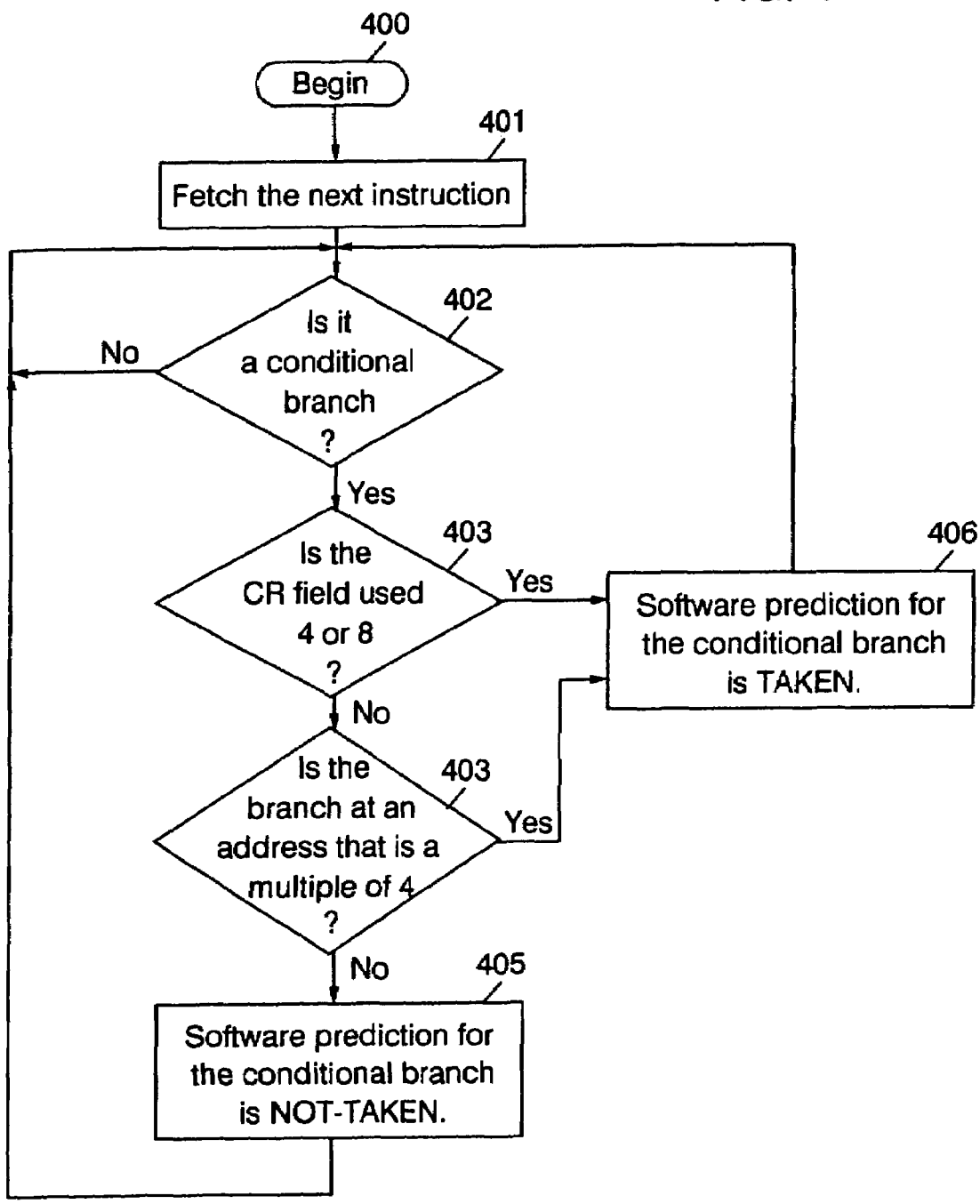
FIG. 4 illustrates a process for determining what the software branch prediction hint is for a given conditional branch instruction.

Referring to FIG. 4, there is illustrated a process for determining what the software branch prediction hint is for a given conditional branch. This process is performed by the microprocessor when the conditional branch instruction is executed. The process begins at step 400 and proceeds to step 401 to fetch the next instruction. In step 402, a determination is made whether this next instruction is a conditional branch instruction. If not, the process loops searching for other conditional branches. However, if the next instruction is a conditional branch instruction, the process proceeds to step 403 to determine if the CR field used is 4 or 8. If YES, then in step 406, it is determined that the software prediction for the conditional branch is taken, and the process returns to step 402. If in step 403, the CR field used is not a 4 or an 8, the process proceeds to step 404 to determine if the branch is at an address that is a multiple of 4. If YES, the process also proceeds to step 406. However, if the branch instruction is not at an address that is a multiple of 4, the process proceeds to step 405 where a software prediction is performed for the conditional branch instruction as not-taken, and the process returns to step 402.

Alternatively, the process in FIG. 4 could be implemented with step 403, but not step 404, so that the padding of instructions described previously is not required. Further, the process could be implemented so that step 404 is implemented but not step 403.

FIG. 4 is performed in the branch prediction logic of the processor 110 which is usually part of the instruction fetch unit (or closely linked to it). FIG. 4 determines the branch prediction hint provided by the software. The processor 110 uses this prediction (that is, may decide to agree with it or disagree with it), as has been discussed hereinabove.

In every cycle, the processor 110 determines if there is an instruction pipeline hold. If there is no hold, the next group of instructions starting from a register called IFAR (Instruction Fetch Address Register) is fetched from the ICache 14 or Memory 114. At the very beginning, IFAR is set to the first instruction of the program to be executed.

The instructions are scanned for conditional branch instructions. For each conditional branch, it is determined whether the branch should be predicted taken or not-taken. In some processors, a compiler hint is used to make this decision. This is where the process in FIG. 4 is utilized. After making the decision of whether the branch should be taken or not-taken, the processor 110 determines where it should fetch the next group of instructions. If there were no branches, or if all the branches in the fetched group of instructions are predicted not-taken, then the IFAR is set to the address next sequential to the last instruction fetched. If there is a conditional branch that is predicted taken, or an unconditional branch, then the IFAR is set to the target of that branch. In the next cycle (assuming there is no stall or "redirect" of the pipeline), the next group of instructions starting from IFAR are fetched.

Stall of the pipeline happens when the back end of the pipeline is full, or a cache miss or similar events happen. "Redirect" of the pipeline happens when a branch has been mispredicted, or there are other architectural violations detected. In these cases, many of the instructions in the pipeline are discarded (depending on the event that caused the pipeline redirect) and the IFAR is set to the address of the new instructions to be fetched and fetching and execution of FIG. 4 starts as described above.

Although the present invention and its advantages have been described in detail, it should be understood that various changes, substitutions and alterations can be made herein without departing from the spirit and scope of the invention as defined by the appended claims.

What is claimed is:

1. A method for predicting a result of a conditional branch instruction, comprising the steps of:
   determining if a specified condition register field of a condition register is used to store a branch condition of the conditional branch instruction; and
   providing a software branch prediction of the conditional branch instruction as a function of the determination if the specified condition register field is used to store the branch condition of the conditional branch instruction.

2. The method as recited in claim 1, wherein the software branch prediction predicts that the conditional branch instruction will be taken if the specified condition register field is used to store the branch condition of the conditional branch instruction.

3. The method as recited in claim 2, wherein the software branch prediction predicts that the conditional branch instruction will be not taken if the specified condition register field is not used to store the branch condition of the conditional branch instruction.

4. The method as recited in claim 1, wherein the software branch prediction predicts that the conditional branch instruction will be not taken if the specified condition register field is used to store the branch condition of the conditional branch instruction.

5. The method as recited in claim 4, wherein the software branch prediction predicts that the conditional branch instruction will be taken if the specified condition register field is not used to store the branch condition of the conditional branch instruction.

6. The method as recited in claim 1, wherein the specified condition register field is N, where N is an integer.

7. The method as recited in claim 6, wherein the specified condition register field is a multiple of N.

8. A processor comprising:
   an instruction fetch unit for fetching a conditional branch instruction;
   circuitry for determining if a specified condition register field is used to store a branch condition of the conditional branch instruction; and circuitry for providing a software branch prediction of the conditional branch instruction as a function of the determination if the specified condition register field is used to store the branch condition of the conditional branch instruction.

9. The processor as recited in claim 8, wherein the software branch prediction predicts that the conditional branch instruction will be taken if the specified condition register field is used to store the branch condition of the conditional branch instruction.

10. The processor as recited in claim 9, wherein the software branch prediction predicts that the conditional branch instruction will be not taken if the specified condition register field is not used to store the branch condition of the conditional branch instruction.

11. The processor as recited in claim 8, wherein the software branch prediction predicts that the conditional branch instruction will be not taken if the specified condition register field is used to store the branch condition of the conditional branch instruction.

12. The processor as recited in claim 11, wherein the software branch prediction predicts that the conditional branch instruction will be taken if the specified condition register field is not used to store the branch condition of the conditional branch instruction.

13. The processor as recited in claim 8, wherein the specified condition register field is N, where N is an integer.

14. The processor as recited in claim 13, wherein the specified condition register field is a multiple of N.

15. A data processing system for predicting whether a conditional branch instruction will be taken or not taken, the data processing system including a computer programmable product embodied in a computer readable medium, the program product comprises the program steps of:

determining if the conditional branch instruction is positioned at a specified address in a sequence of instructions being executed; and predicting whether the conditional branch instruction will be taken or not taken as a function of the position of the specified address.

16. The data processing system as recited in claim 15, wherein the predicting program step will predict taken if the specified address is a multiple of specified number N.

\* \* \* \* \*